(12) United States Patent
Senseney et al.

(10) Patent No.: US 8,410,378 B1
(45) Date of Patent: Apr. 2, 2013

(54) GROUNDING FITTING

(75) Inventors: Erik G. Senseney, Fairfield, CT (US); Lawrence J. Smith, Stamford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 34 days.

(21) Appl. No.: 13/373,107

(22) Filed: Nov. 4, 2011

(51) Int. Cl.
*H02G 3/18* (2006.01)

(52) U.S. Cl. ........ 174/665; 174/650; 174/666; 174/659; 174/72; 174/656; 439/562

(58) Field of Classification Search ............ 174/650, 174/666, 659, 656, 668, 665, 72; 439/552, 439/557
See application file for complete search history.

(56) References Cited

U.S. PATENT DOCUMENTS

| | | | |
|---|---|---|---|
| 2,974,185 A | 3/1961 | Curtiss | |
| 3,027,533 A | 3/1962 | Owen | |
| 4,526,437 A | 7/1985 | Kies | |
| D360,188 S | 7/1995 | Kiely et al. | |
| 5,494,462 A | 2/1996 | Auclair | |
| 5,928,006 A | 7/1999 | Franks, Jr. | |
| D487,062 S | 2/2004 | Foster | |
| D577,977 S | 10/2008 | Hernandez | |
| D585,833 S | 2/2009 | Sherman | |
| 7,488,905 B2 * | 2/2009 | Kiely et al. | 174/666 |
| 7,494,157 B1 | 2/2009 | Kiely | |
| 7,537,467 B1 | 5/2009 | Gretz | |
| D629,364 S | 12/2010 | Smith et al. | |
| 7,901,256 B1 | 3/2011 | Kiely | |
| D635,520 S | 4/2011 | Kiely | |
| 7,927,157 B1 | 4/2011 | Kiely | |
| 8,097,819 B2 * | 1/2012 | Su | 174/665 |
| 8,119,933 B2 * | 2/2012 | Auray et al. | 174/650 |
| 2003/0040214 A1 | 2/2003 | Kiely | |

* cited by examiner

*Primary Examiner* — Dhirubhai R Patel

(74) *Attorney, Agent, or Firm* — Ware, Fressola, Maguire & Barber LLP

(57) ABSTRACT

A grounding fitting for mounted engagement with an electrical enclosure has an elongated body with a first generally cylindrically shaped section and a hub section. Both sections have a longitudinally extending passageway dimensioned for passage of a ground electrode/ground rod. The first section includes a threaded aperture for receipt of a screw to electrically and mechanically secure a ground electrode/ground rod to the grounding fitting. The hub section is also dimensioned to secure a rigid or EMT conduit thereto. The first section includes a flange at one end with associated threads formed in the outer surface of the first section to mechanically and electrically secure the grounding fitting to an electrical enclosure with a locking ring. An O-ring positioned in the flange provides a fluid resistant barrier relative to the interior of the electrical enclosure.

10 Claims, 6 Drawing Sheets

GROUNDING FITTING

FIELD OF THE INVENTION

This invention relates to electrical connectors and more particularly to grounding fittings for bonding and securing ground electrodes/ground rods to electrical enclosures, such as an electrical service boxes, meter boxes, and the like.

BACKGROUND OF THE INVENTION

In the field of wiring homes and buildings, whether for new construction or for improvements or expansion, substantial development and product improvements have been made. Typically, these improvements are directed to enabling installers to securely and safely mount any desired wiring to any desired location in the most efficient and quickest manner.

In any particular installation or location, various conduits or cables must be interconnected to each other as well as connected to a primary utility power supply in a suitable power distributing outlet box, junction box, meter box, or other electrical enclosure. In these instances, flexible metal conduit and/or armor or metalclad cables within which the electrical power carrying wires are contained, must be securely mounted to the housing of a junction box or outlet box, or connected to an appropriate solid or rigid metal tubing or conduit so as to provide appropriate grounding.

In addition, in order to assure that the installed conduits or cables and the electrical power carrying wires contained therein are properly and safely installed for operation, power distributing outlet boxes, junction boxes, meter boxes, and other similar enclosures typically incorporate a ground bus bar or the like which electrically bonds and secures a particular box to a properly installed ground electrode or ground rod which is typically electrically secured to earth ground. In this way, all of the power carrying wires installed in the particular home or building are properly associated with a ground conductor that is bonded and connected to an earth ground.

Various prior art grounding fittings (also called bonding and grounding clamps/connectors) have been developed to assist in providing a secure electrical ground to an electrical enclosure which are designed to interfit with a ground electrode or ground rod (see, for example, current assignee's U.S. Pat. Nos. 7,901,256 and 7,927,157). There has also been a need to provide such a grounding fitting which can easily further accommodate a rigid conduit or electrical metallic tubing (EMT) conduit that surrounds the ground electrode or ground rod. Although prior art grounding fittings have provided some attachment with respect to a rigid conduit or EMT conduit, such as shown in FIGS. 5-7 of U.S. Pat. No. 7,927,157, there has not been provided a grounding fitting which can be used with both a rigid conduit or EMT conduit in a way that securely fastens such a conduit to the grounding fitting in an inexpensive and reliable fashion.

There has further been a need to provide for a mechanical seal between the grounding fitting and an electrical enclosure so as to provide a fluid resistant barrier between the outside and the inside of an electrical enclosure once the grounding fitting has been installed. It is to provide such an improved grounding fitting to which the present invention is directed.

SUMMARY OF THE INVENTION

Accordingly, it is an object of the present invention to provide a grounding fitting for mounted engagement with an electrical enclosure, that comprises an elongated body incorporating a first generally cylindrically shaped section terminating at a first end and a hub section terminating at a second end, the first section having a first longitudinally extending passageway formed therein extending completely through the first section from the first end to an end opposite the first end, the passageway dimensioned for receiving a ground electrode/ground rod; an enlarged flange radially extending outwardly from the cylindrically shaped first section at the end opposite the first end, the flange dimensioned for abutting contact with a surface of the electrical enclosure surrounding a knockout hole formed in the electrical enclosure, the flange further having a circular recess formed in a face thereof directed toward the first end of the first section, the recess dimensioned for receipt of an O-ring; a threaded aperture formed in the first section extending from an outer surface thereof and terminating with the longitudinally extending passageway, the threaded aperture dimensioned for receipt of a screw to securely fasten to the ground electrode/ground rod within the first passageway; the hub section of the body having a second longitudinally extending passageway formed therethrough, terminating with the first longitudinal extending passageway so as to form a continuous path through the body, the second passageway dimensioned for receipt of a rigid conduit/electrical metallic tubing (EMT) conduit, the hub section having a threaded aperture extending from an outer surface thereof and terminating with the second passageway, the threaded aperture dimensioned for receipt of a screw to securely fasten to the rigid conduit/EMT conduit, wherein the outer surface of the first section has an outer diameter dimensioned for passage through the knockout hole formed in the electrical enclosure, at least a portion of the outer surface having a threaded zone in proximity to the flange for receipt of a locking ring so as to enable the grounding fitting to be securely affixed to the electrical enclosure through the knockout hole via contact of the flange and O-ring with the surface of the electrical enclosure surrounding the conventional knockout hole, so that the screw mounted in the threaded aperture of the first section is positioned inside the electrical enclosure and so that a fluid resistant seal is formed between the grounding fitting and the electrical enclosure.

Another embodiment of the present invention is a grounding fitting as described above, wherein the second passageway formed in the hub section of the body incorporates a threaded region dimensioned for threaded engagement with threads formed on an end of a rigid conduit.

A further embodiment of the present invention is a grounding fitting as described above, wherein the grounding fitting is further defined as being constructed from an electrically conductive material.

A still further embodiment of the present invention is a grounding fitting as described above, wherein the electrically conductive material of the grounding fitting is further defined as comprising one selected from the group consisting of aluminum, copper, steel, zinc plated steel, and alloys thereof.

Another embodiment of the present invention is a grounding fitting as described above, wherein the screw associated with securely fastening to the rigid conduit/EMT conduit is dimensioned for receipt of an inspection tag affixed to the hub section by the screw.

A further embodiment of the present invention is a grounding fitting as described above, wherein the hub section comprises a plurality of flat faces.

BRIEF DESCRIPTION OF THE DRAWINGS

For a fuller understanding of the nature and objects of the invention, reference is made to the following detailed description taken in conjunction with the accompanying drawings in which.

DETAILED DESCRIPTION

Figure 1:
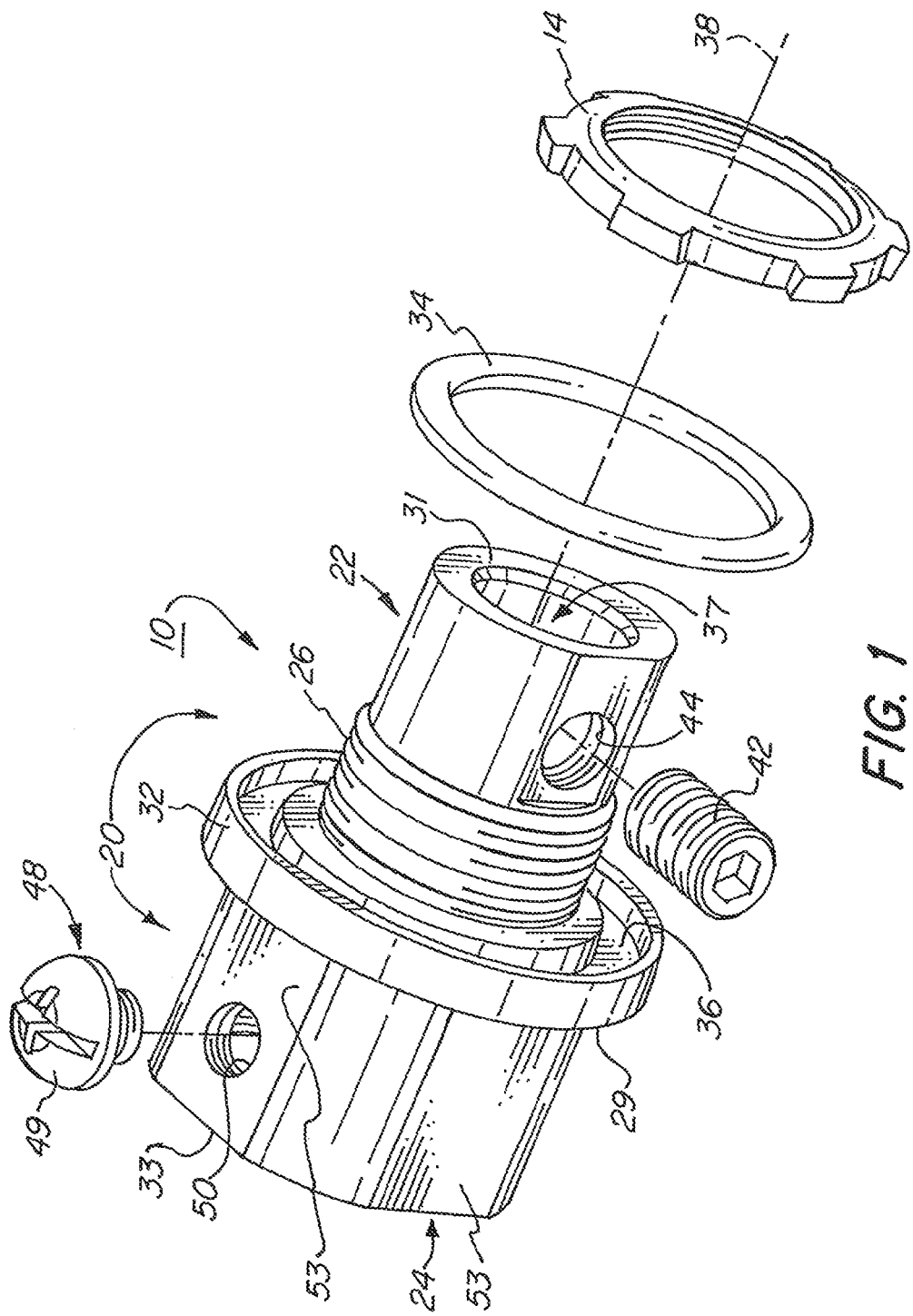
FIG. 1 is a perspective view of an embodiment of the grounding fitting according to the present invention.

FIGS. 1-6 illustrate a first embodiment of a grounding fitting 10 according to the present invention. The grounding fitting comprises an elongated body 20 that in turn includes a first section 22 and a hub section 24. First section 22 has a first end 31 forming an end face and an opposite end 29. Hub section 24 has a second end 33 forming an end face and an opposite end 35 adjacent opposite end 29 of first section 22.

Figure 2:
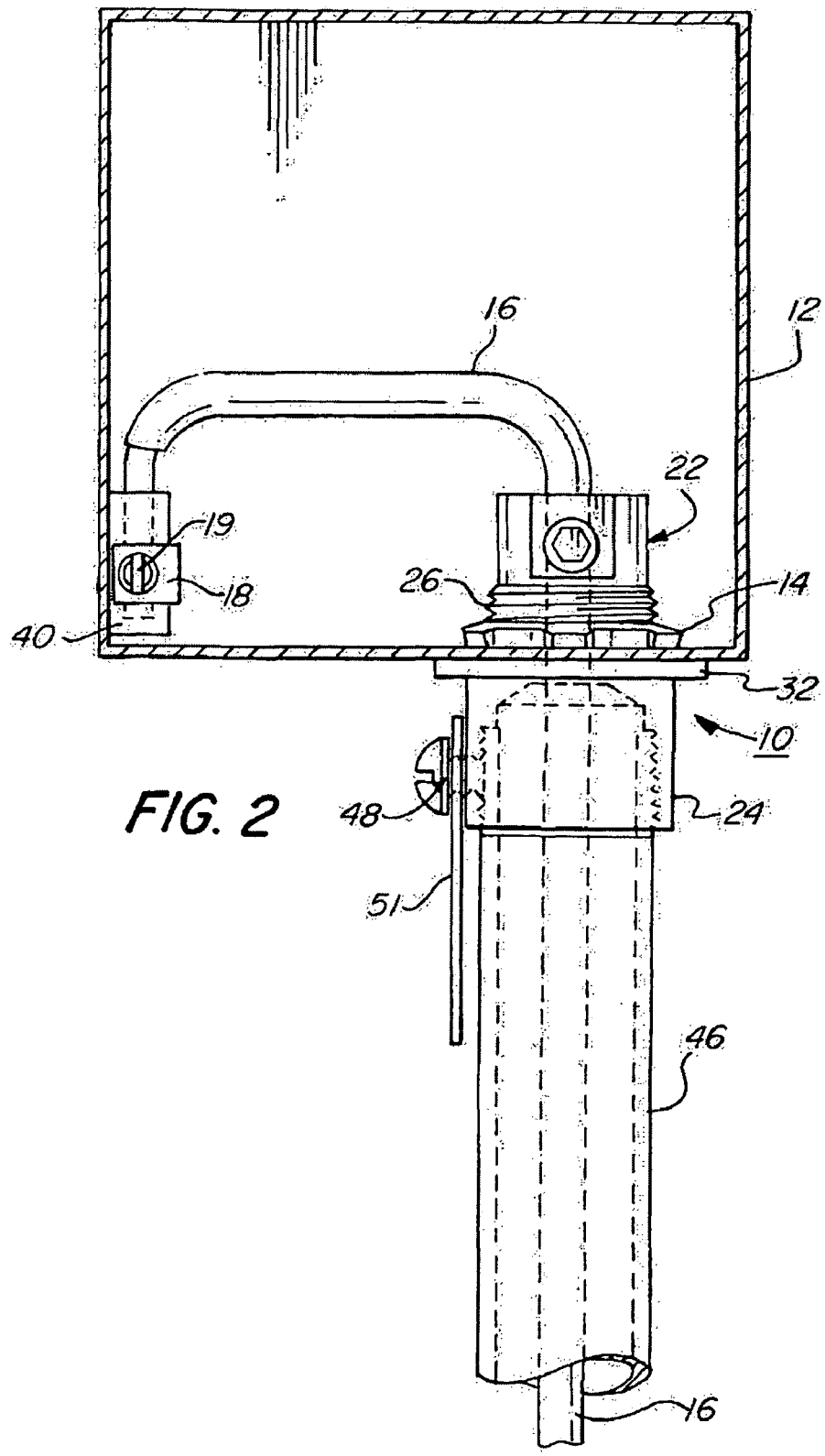
FIG. 2 is a side view of the grounding fitting shown in FIG. 1 installed in an electrical enclosure with the electrical enclosure, ground electrode and rigid or EMT conduit shown in phantom.
Figure 3:
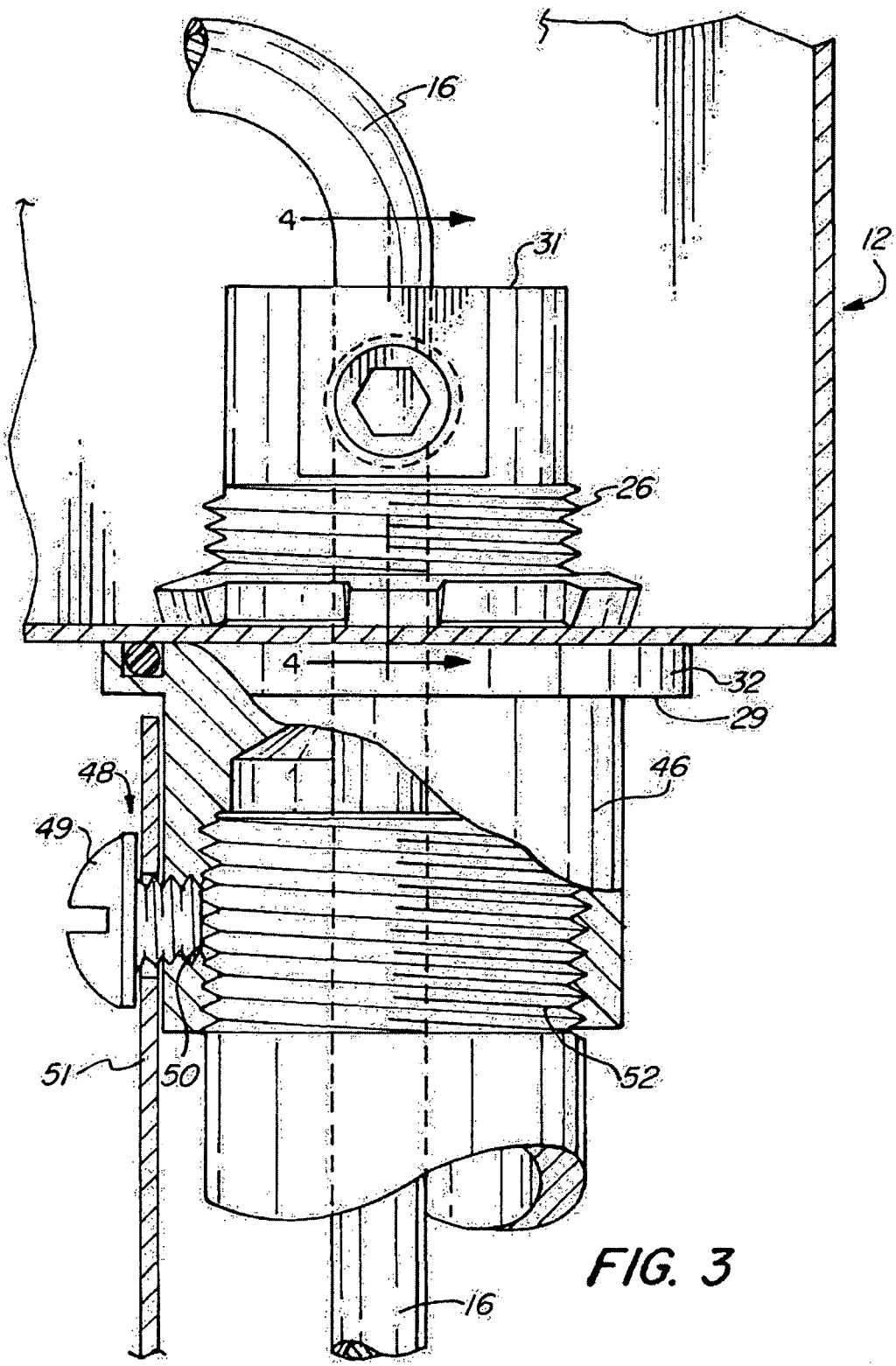
FIG. 3 is an enlarged partial cross-sectional view of the grounding fitting shown in FIG. 1 installed in an electrical enclosure in an orientation similar to that of FIG. 2.
Figure 4:
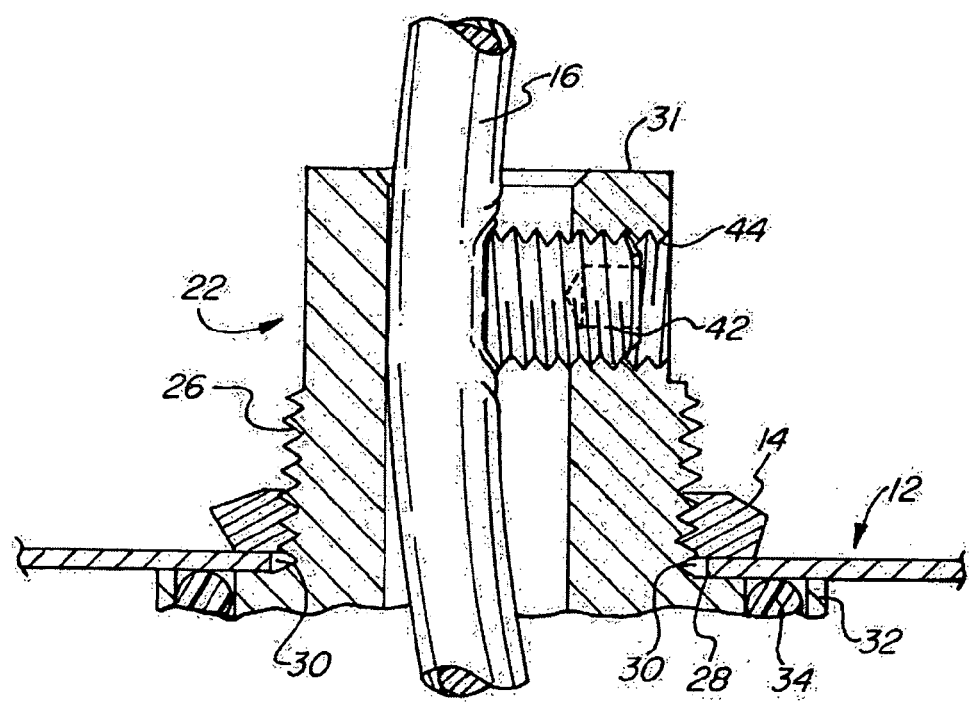
FIG. 4 is a cross-sectional view of a portion of the grounding fitting installed in an electrical enclosure taken along line 4-4 of FIG. 3.
Figure 5:
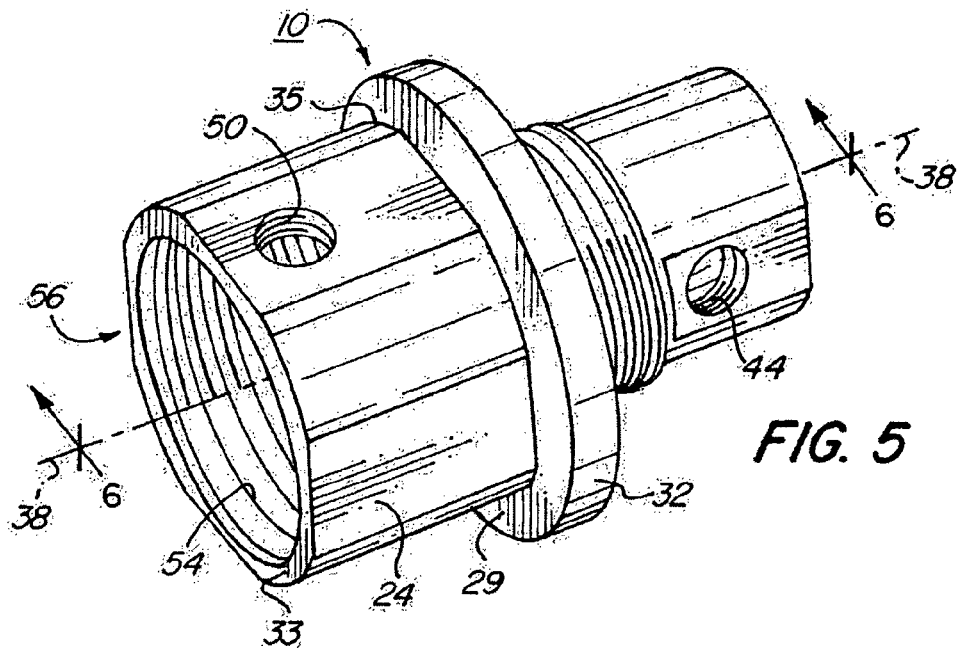
FIG. 5 is a second perspective view of the grounding fitting shown in FIG. 1, illustrating the threads within the hub section of the body of the grounding fitting.
Figure 6:
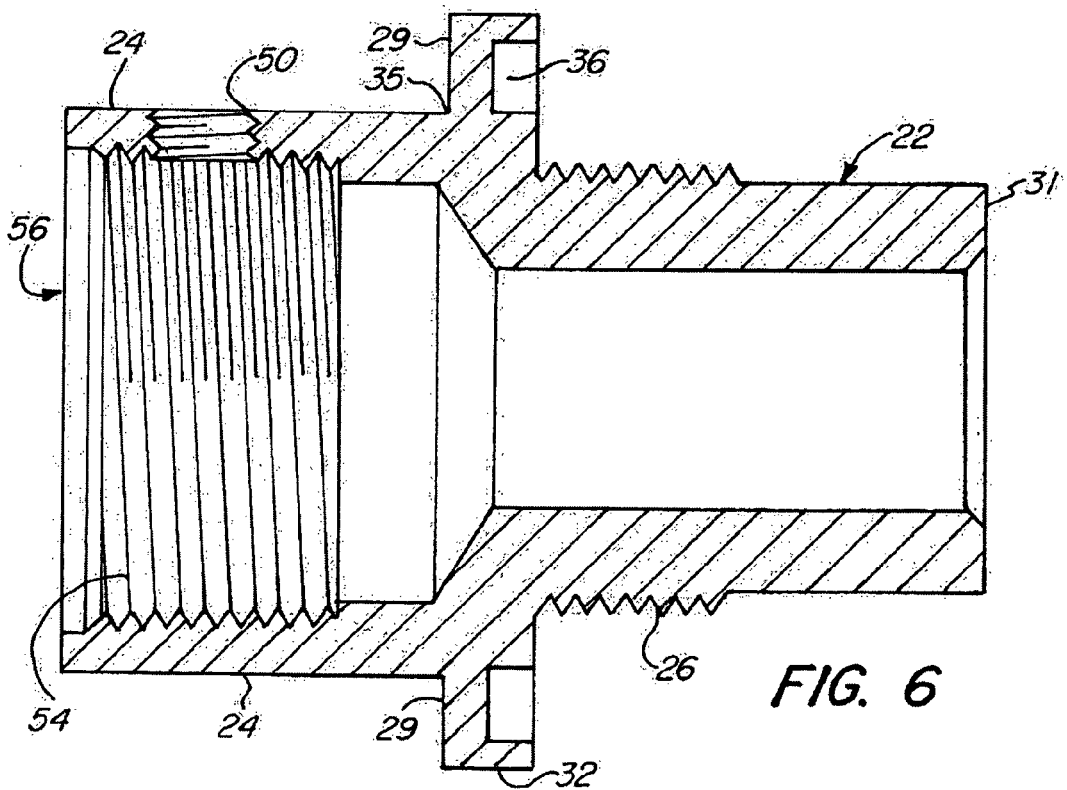
FIG. 6 is a cross-sectional view of the grounding fitting taken along line 6-6 of FIG. 5.

As seen in FIGS. 2, 3, and 4, the grounding fitting 10 is designed to be installed within an electrical enclosure 12, with the first section 22 mounted inside the electrical enclosure and secured thereto by means of locking ring 14. The locking ring secures the grounding fitting to electrical enclosure 12 by engaging with threads 26 forming a threaded zone on the outer surface of first section 22. As best seen in FIGS. 3 and 4, the locking ring engages with a portion 28 of the electrical enclosure that surrounds a knockout hole 30 in the electrical enclosure, thereby forcing this portion of the electrical enclosure between locking ring 14 and flange 32 formed at end 29 opposite a first end 31 of the first section 22.

An O-ring 34 is also positioned within a circular recess 36 of the flange as seen in FIG. 1. This O-ring forms a fluid resistant seal about the knockout hole thereby keeping water and other contaminants from entering the inside of electrical enclosure 12.

As seen in FIGS. 1-4, the first section 22 of grounding fitting 10 includes a first longitudinally extending passageway 37 positioned about axis 38 having an inside diameter sufficient for receipt of a ground electrode or ground rod 16. This ground rod is typically secured to the electrical enclosure by means of a coupler 18 and associated screw 19 which in turn makes electrical contact and bonding with a bus bar 40 within the electrical enclosure.

As seen in FIGS. 1-4, a screw 42, such as a hex screw, is threaded within a threaded aperture 44 in the first fitting 22, thereby squeezing the ground electrode/ground rod 16 to the inside wall of the passageway 37 of the first section 22, as best seen in FIGS. 3 and 4. Once installed, the first section of the grounding fitting is primarily positioned inside the electrical enclosure, except for flange 32 and O-ring 34.

FIGS. 1-6 also show the configuration of hub section 20, including the use of the hub section to secure a rigid conduit or electrical metallic tubing (EMT) conduit 46 to the hub section 24 by means of screw 48. The screw 48 has a head 49 that is sufficiently large so as to retain an inspection tag 51, if such a tag is to be attached to grounding fitting 10. As seen in FIG. 1, the screw 24 is threaded within a threaded aperture 50 formed within the hub so as to press against the rigid conduit or EMT conduit 46. It should be noted that rigid conduit typically has a threaded end region 52 as seen in FIG. 3. The second longitudinally extending passageway 56 of the hub section can include a threaded region 54 dimensioned for threaded engagement with the threaded end region 52 of rigid conduit 46.

The hub section may also have a multi-faceted outer surface with a plurality of flat faces 53 to facilitate securing the grounding fitting with a wrench or the like during installation of the grounding fitting to electrical enclosure 12.

The EMT conduit 46 typically does not have an outer threaded region at its end, but is at least secured to the hub section 24 by means of screw 48 passing within threaded aperture 50.

The grounding fitting 10 is typically manufactured from an electrically conductive metal, such as copper, aluminum, steel and alloys thereof. It can also be manufactured from galvanized steel (zinc plated steel).

As seen in FIGS. 2-4, once grounding fitting is installed, the ground electrode/ground rod 16 provides an earth ground to electrical enclosure 12 while rigid or EMT conduit 46 provides weather and vandal protection to ground electrode/ground rod 16.

Figure 7:
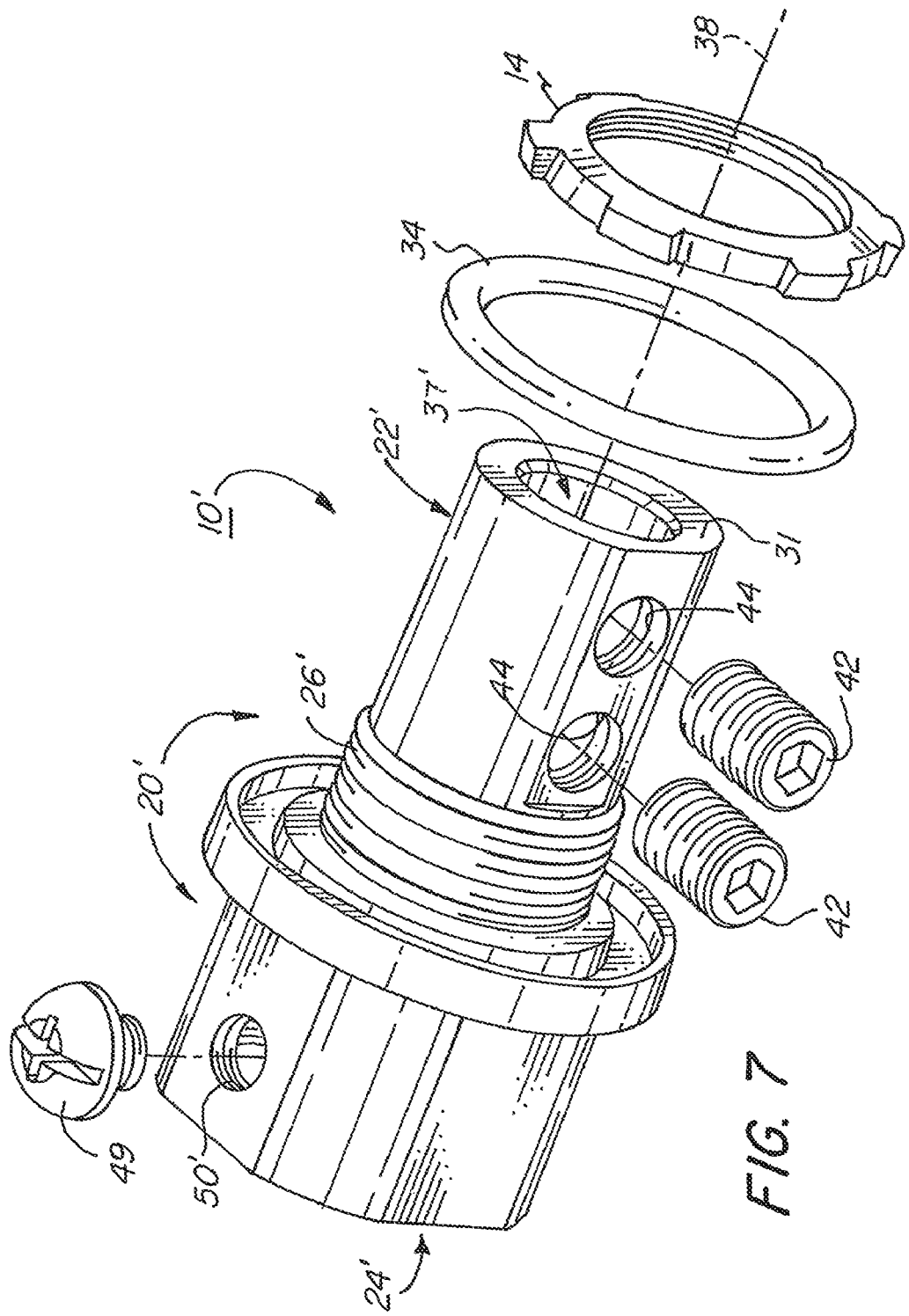
FIG. 7 is a perspective view of another embodiment of the grounding fitting according to the present invention, showing use of two screws for securing a ground electrode/ground rod to a first section of the body of the grounding fitting.

FIG. 7 shows another embodiment of the present invention illustrating a grounding fitting 10' corresponding to that shown in FIGS. 1-6 except that it includes two threaded apertures 44 in an elongated first section 22' of elongated body 20'. Two screws 42 are secured in these threaded aperturesso as to mechanically and electrically secure a ground rod/ground electrode 16 passing through first longitudinally extending passageway 37' formed within first section 22' along axis 38 to the passageway 37' and thus to grounding fitting 10'. The remaining components of this embodiment of the grounding fitting correspond to those shown in FIGS. 1-6.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A grounding fitting for mounted engagement with an electrical enclosure, comprising:

an elongated body comprising a first section generally cylindrically shaped terminating at a first end of the elongated body and a hub section terminating at a second end of the elongated body, the first section having a first longitudinally extending passageway formed therein extending completely through the first section from the first end to an end of the first section opposite the first end, the passageway dimensioned for receiving a ground electrode/ground rod;

an enlarged flange radially extending outwardly from the first section at the end opposite the first end, the flange dimensioned for abutting contact with a surface of the electrical enclosure surrounding a knockout hole formed in one of a plurality of sides the electrical enclosure, the flange further having a circular recess formed in a face thereof directed toward the first end of the first section, the recess dimensioned for receipt of an O-ring;

a first threaded aperture formed in the first section extending from an outer surface thereof and terminating with the longitudinally extending passageway, the first threaded aperture dimensioned for receipt of a first screw to securely fasten to the ground electrode/ground rod within the first passageway;

the hub section of the body having a second longitudinally extending passageway formed therethrough, terminating with the first longitudinally extending passageway so as to form a continuous path through the body for receipt of the ground electrode/ground rod, the second passageway dimensioned for receipt of a rigid conduit/electrical metallic tubing (EMT) conduit, the hub section having a second threaded aperture extending from an outer surface thereof and terminating with the second passageway, the second threaded aperture dimensioned for receipt of a second screw to securely fasten to the rigid conduit/EMT conduit, wherein the outer surface of the first section has an outer diameter dimensioned for passage through the knockout hole formed in the electrical enclosure, at least a portion of the outer surface having a threaded zone in proximity to the flange for receipt of a locking ring so as to enable the grounding fitting to be securely affixed to the electrical enclosure through the knockout hole via contact of the flange and O-ring with the surface of the electrical enclosure surrounding the knockout hole, so that the first screw mounted in the first threaded aperture of the first section is positioned inside the electrical enclosure and so that a fluid resistant seal is formed between the grounding fitting and the electrical enclosure.

2. The grounding fitting according to claim 1, wherein the second passageway formed in the hub section of the body incorporates a threaded region dimensioned for threaded engagement with threads formed on an end of a rigid conduit.

3. The grounding fitting according to claim 2, wherein the grounding fitting is further defined as being constructed from an electrically conductive material.

4. The grounding fitting according to claim 3, wherein the electrically conductive material of the grounding fitting is further defined as comprising one selected from the group consisting of aluminum, copper, steel, zinc plated steel, and alloys thereof.

5. The grounding fitting according to claim 4, wherein the screw associated with securely fastening to the rigid conduit/EMT conduit is dimensioned for receipt of an inspection tag affixed to the hub section by the screw.

6. The grounding fitting according to claim 5, wherein the hub section comprises a plurality of flat faces.

7. The grounding fitting according to claim 6, wherein the electrically conductive material of the grounding fitting is further defined as comprising one selected from the group consisting of aluminum, copper, steel, zinc plated steel, and alloys thereof.

8. The grounding fitting according to claim 6, wherein the hub section comprises a plurality of flat faces.

9. The grounding fitting according to claim 1, wherein the grounding fitting is further defined as being constructed from electrically conductive material.

10. The grounding fitting according to claim 1, wherein the screw associated with securely fastening to the rigid conduit/EMT conduit is dimensioned for receipt of an inspection tag affixed to the hub section by the screw.

* * * * *